(12) United States Patent
Mizobe

(10) Patent No.: US 7,924,468 B2
(45) Date of Patent: Apr. 12, 2011

(54) CAMERA SHAKE DETERMINATION DEVICE, PRINTING APPARATUS AND CAMERA SHAKE DETERMINATION METHOD

(75) Inventor: Kimitake Mizobe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 633 days.

(21) Appl. No.: 12/002,991

(22) Filed: Dec. 18, 2007

(65) Prior Publication Data

US 2008/0151309 A1    Jun. 26, 2008

(30) Foreign Application Priority Data

Dec. 20, 2006 (JP) .................. 2006-342678
Oct. 10, 2007 (JP) .................. 2007-264697

(51) Int. Cl.
*H04N 1/409* (2006.01)
(52) U.S. Cl. ......... 358/3.26; 358/1.9; 382/255; 382/275
(58) Field of Classification Search .................... 358/1.1, 358/1.9, 3.26, 3.27; 382/199, 254, 255, 266, 382/275

See application file for complete search history.

(56) References Cited

U.S. PATENT DOCUMENTS

2005/0249429 A1* 11/2005 Kitamura ...................... 382/255
2008/0008398 A1* 1/2008 Tanaka et al. ................. 382/275

FOREIGN PATENT DOCUMENTS

JP    2006-019874    1/2006
JP    2007-220009    8/2007

OTHER PUBLICATIONS

Abstract of Japanese Patent Publication No. 2006-019874, Pub. Date: Jan. 19, 2006, Patent Abstracts of Japan.
Abstract of Japanese Patent Publication No. 2007-220009, Pub. Date: Aug. 30, 2007, Patent Abstracts of Japan.

* cited by examiner

*Primary Examiner* — Thomas D Lee
(74) *Attorney, Agent, or Firm* — Martine Penilla & Gencarella, LLP

(57) ABSTRACT

The device employs a plurality of coefficients recorded in image data to detect whether edges are included per block, and determines as the blur level the proportion of edges, among the detected edges, in which the edge width is over a certain threshold. The device also determines, per block, coordinates composed of a first coefficient value representing frequency components in a first direction in the blocks and a second coefficient value representing frequency components in a second direction perpendicular to the first direction, and calculates the extent of bias in the distribution of the coordinates as the ellipticity. The device determines whether or not blurring has been produced by camera shake in an image based on the relationship between the blur level and ellipticity which have thus been determined.

11 Claims, 18 Drawing Sheets

Fig.5

DC COMPONENT — LOW AC COMPONENTS (HORIZONTAL DIRECTION) HIGH → HORIZONTAL COEFFICIENT GROUP

| F00 | F01 | F02 | F03 | F04 | F05 | F06 | F07 |
|-----|-----|-----|-----|-----|-----|-----|-----|
| F10 | F11 | F12 | F13 | ... | ... | ... | ... |
| F20 | F21 | F22 | ... | ... | ... | ... | ... |
| F30 | F31 | ... | F33 | ... | ... | ... | ... |
| F40 | ... | ... | ... | ... | ... | ... | ... |
| F50 | ... | ... | ... | ... | ... | ... | ... |
| F60 | ... | ... | ... | ... | ... | ... | ... |
| F70 | ... | ... | ... | ... | ... | ... | F77 |

AC COMPONENT (VERTICAL) LOW → HIGH

VERTICAL COEFFICIENT GROUP

Fig.11

EDGE PATTERN TABLE 181

| PATTERN NO. | LUMINANCE PATTERN (※REFERENCE) | BASIC EDGE PATTERN (NORMALIZED DCT COEFFICIENT) | EDGE WIDTH | | |
|---|---|---|---|---|---|
| | | | LW | MW | RW |
| A1 | | | 0 | 1 | 5 |
| A2 | | | 0 | 2 | 4 |
| A3 | | | 0 | 3 | 3 |
| A4 | | | 0 | 4 | 2 |
| ⋮ | ⋮ | ⋮ | ⋮ | ⋮ | ⋮ |
| A14 | | | 2 | 3 | 1 |
| A15 | | | 1 | 4 | 1 |
| A16 | | | 1 | 5 | 0 |
| B1 | ⋮ | ⋮ | ⋮ | ⋮ | ⋮ |
| ⋮ | ⋮ | ⋮ | ⋮ | ⋮ | ⋮ |

ADJACENT BLOCK + BLOCK UNDER SCRUTINY = DIRECTION OF INCLINE ALIGNED

ADJACENT BLOCK + BLOCK UNDER SCRUTINY = DIRECTION OF INCLINE NOT ALIGNED

ADJACENT BLOCK    BLOCK UNDER SCRUTINY

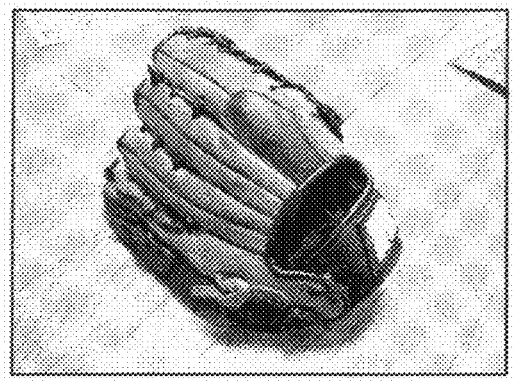
Fig.17(A) NORMAL IMAGE
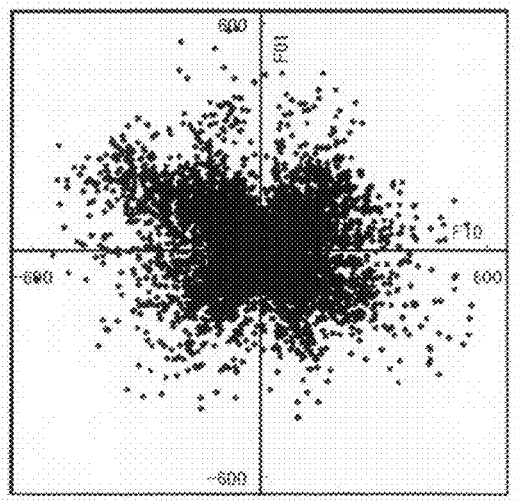
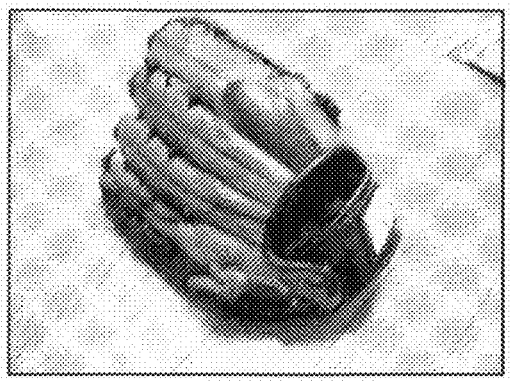
Fig.17(B) CAMERA SHAKE IMAGE
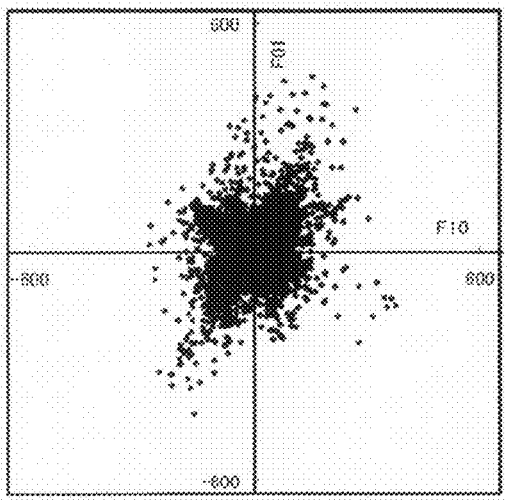

Fig.21
| PATTERN NO. | LUMINANCE PATTERN (※REFERENCE) | BASIC EDGE PATTERN | EDGE WIDTH | | |
|---|---|---|---|---|---|
| | | | LW | MW | RW |
| A1 | 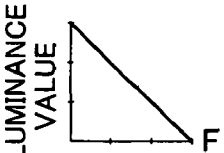 |  | 0 | 3 | 0 |
| A2 | 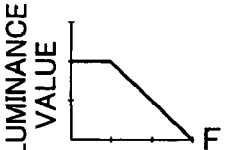 | 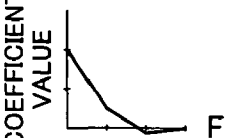 | 1 | 2 | 0 |
| A3 | 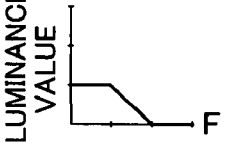 | 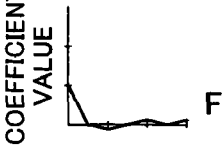 | 1 | 1 | 1 |
| A4 | 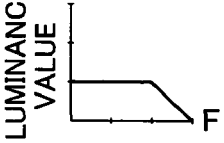 | 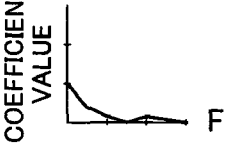 | 2 | 1 | 0 |

CAMERA SHAKE DETERMINATION DEVICE, PRINTING APPARATUS AND CAMERA SHAKE DETERMINATION METHOD

CLAIM OF PRIORITY

The present application claims the priority based on Japanese Patent Applications No. 2006-342678 filed on Dec. 20, 2006 and No. 2007-264697 filed on Oct. 10, 2007, the disclosures of which are hereby incorporated by reference in their entirety.

BACKGROUND

1. Technical Field

The invention relates to a technique for detecting blurring that has been produced in images as a result of camera shake.

2. Related Art

Digital still cameras have recently become popular, and the capacity of the memory cards used therein have been expanded. As a result, general users are storing greater amounts of images. Digital still cameras require no film and allow photographs to be taken more casually, often resulting in photographing with unintentional camera shake. As such, images are relatively often blurred due to camera shake, and attempts to print such images on a printing apparatus require normal images to be selected beforehand.

It is extremely cumbersome to have to select normal images from out of an abundance of images. A desirable technique would therefore automatically exclude blurred images from the images to be printed before the user prints the images. In relation to such a technique for detecting blurring, JP-A-2006-19874 discloses a technique for detecting whether or not there is any blurring in images based on bit map data in the digital still camera used to photograph the images.

However, since recent digital still cameras can photograph images with a high resolution of several millions to ten millions of pixels, the bit map data volume can be quite extensive. As a result, CPUs with a high processing capacity and greater memory volume are needed, resulting in greater manufacturing costs, in order to detect blurring based on bit map data in compact devices such as digital still cameras and printers.

SUMMARY

In view of the various problems noted above, an object which the present invention is intended to address is to detect blurring in images produced as a result of camera shake while minimizing the processing burden or the memory volume that is used.

In view of the foregoing, the device in one aspect of the invention is a device for determining whether or not blurring in images has been produced by camera shake, the device comprising: an image data reference module configured to reference image data in which has been recorded, per block unit, coefficients that are obtained when pixel values forming a image in a spatial domain are converted to a frequency domain per block unit composed of a plurality of pixels; a blur level determination module configured to detect whether edges are included per block unit using the coefficients, and determine as a blur level the proportion of edges, among the detected edges, in which the edge width is over a certain threshold; an ellipticity determination module configured to determine coordinates composed of first coefficient values and second coefficient values per block in a coordinate system in which the coordinate axes are first coefficient values representing frequency components in a first direction in the blocks and second coefficient values representing frequency components in a second direction perpendicular to the first direction in the blocks, and calculate an extent of bias in the distribution of the coordinates as the ellipticity; and a camera shake determination module configured to determine whether blurring in the image has been produced by camera shake based on the relationship between the blur level and the ellipticity.

According to the device in the above aspect, the coefficients recorded in the image data are used to determine the blur level and the ellipticity, thereby determining whether or not there is any camera shake based on their values. It is thus possible to determine whether or not an image is blurred without converting the coefficients to pixel values. As a result, there is less of a process burden in determining camera shake, allowing the presence or absence of camera shake to be rapidly determined. In addition, according to the device in the above aspect, there is no need to ensure memory area for the conversion from coefficients to pixel values. The memory volume that is used can therefore be decreased. "Edge" refers to a border where there is a precipitous change in pixel values (such as luminance, hue, RBG values). "Edge width" refers to the width of the border. When the "edge width" expands, the border component becomes blurred.

In the device of the above aspect, the image data for which camera shake is determined may be produced based on the JPEG standard, for example. In this case, coefficients refer to so-called DCT coefficients, which are obtained by the discrete cosine transform of pixel values per block. The spatial domain can be converted to the frequency domain using, for example, the Fourier transform or wavelet transform instead of the discrete cosine transform.

When the image data is produced based on the JPEG standard, the device may record the result of the camera shake determination in the header of the JPEG data (such as EXIF). This will allow printers and computers to use the camera shake determination data to select images to print according to whether or not they have camera shake and to carry out a variety of image processes.

Aspects of the invention other than the above device also comprise a printer, camera shake determination method, and computer program. A computer program may be recorded on computer-readable recording media. Examples of recording media include a variety of media such as floppy disks, CD-ROM, DVD-ROM, opticomagnetic disks, memory cards, and hard disks.

These and other objects, features, aspects, and advantages of the present invention will become more apparent from the following detailed description of the preferred embodiments with the accompanying drawings.

BRIEF DESCRIPTION OF THE DRAWINGS

FIG. 5 shows an illustration of series of DCT coefficients obtained by inverse quantization processor;

FIG. 11 is an illustration of example of edge pattern table;

FIG. 17(A) and FIG. 17(B) show illustrations of specific example of camera shake-induced change in coefficients;

FIG. 21 shows an illustration of example of edge pattern table for block size of 4×4.

DESCRIPTION OF THE PREFERRED EMBODIMENT

Modes for implementing the invention will be elaborated in the following order based on the embodiments below.

1. 1st Embodiment
A. Printer Structure
B. Printing Process
C. Camera Shake Determination Process
D. Effects
2. 2nd Embodiment
3. 3rd Embodiment
4. Modifications
5. Other Aspects

1. 1st Embodiment

A. Printer Structure

Figure 1:
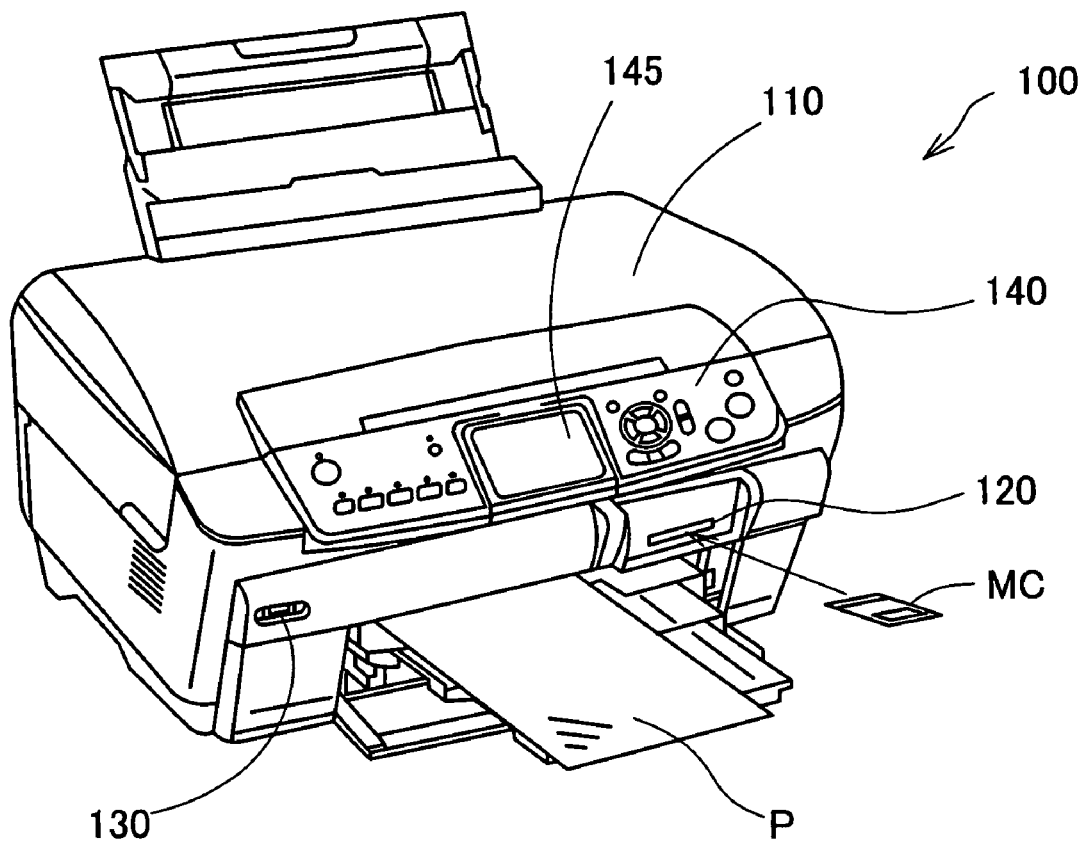
FIG. 1 shows an appearance of printer in an embodiment of the invention.

FIG. 1 illustrates the appearance of a printer 100 as an embodiment of the invention. The printer 100 is a multifunctional printer. The printer 100 is equipped with a scanner 110 that optically scans images, a memory card slot 120 for inserting a memory card MC on which image data has been recorded, and a USB interface 130 for connecting devices such as digital cameras. The printer 100 is able to print images scanned by the scanner 110, images read from the memory card MC, and images read from a digital camera via the USB interface 130 on printing paper P. The printer 100 can also print images input from a personal computer (not shown) connected by a printer cable or USB cable.

The printer 100 is equipped with an operating panel 140 for a variety of printing-related operations. A liquid crystal display 145 is provided in the center of the operating panel 140. Displayed on the liquid crystal display 145 are images read from the memory card MC, digital camera, or a GUI (graphical user interface) when the various functions of the printer 100 are employed.

The printer 100 has the function of eliminating images blurred by camera shake ("camera shake images") from among the plurality of image data input from the memory card MC or the digital camera, and extracting images that are focused in even one location ("focused images") for display on the liquid crystal display 145. The user can select desired images from among the images displayed on the liquid crystal display 145 to print images that are suitable for printing. The printer 100 structure and process for executing the function of eliminating camera shake images are described in detail below.

Figure 2:
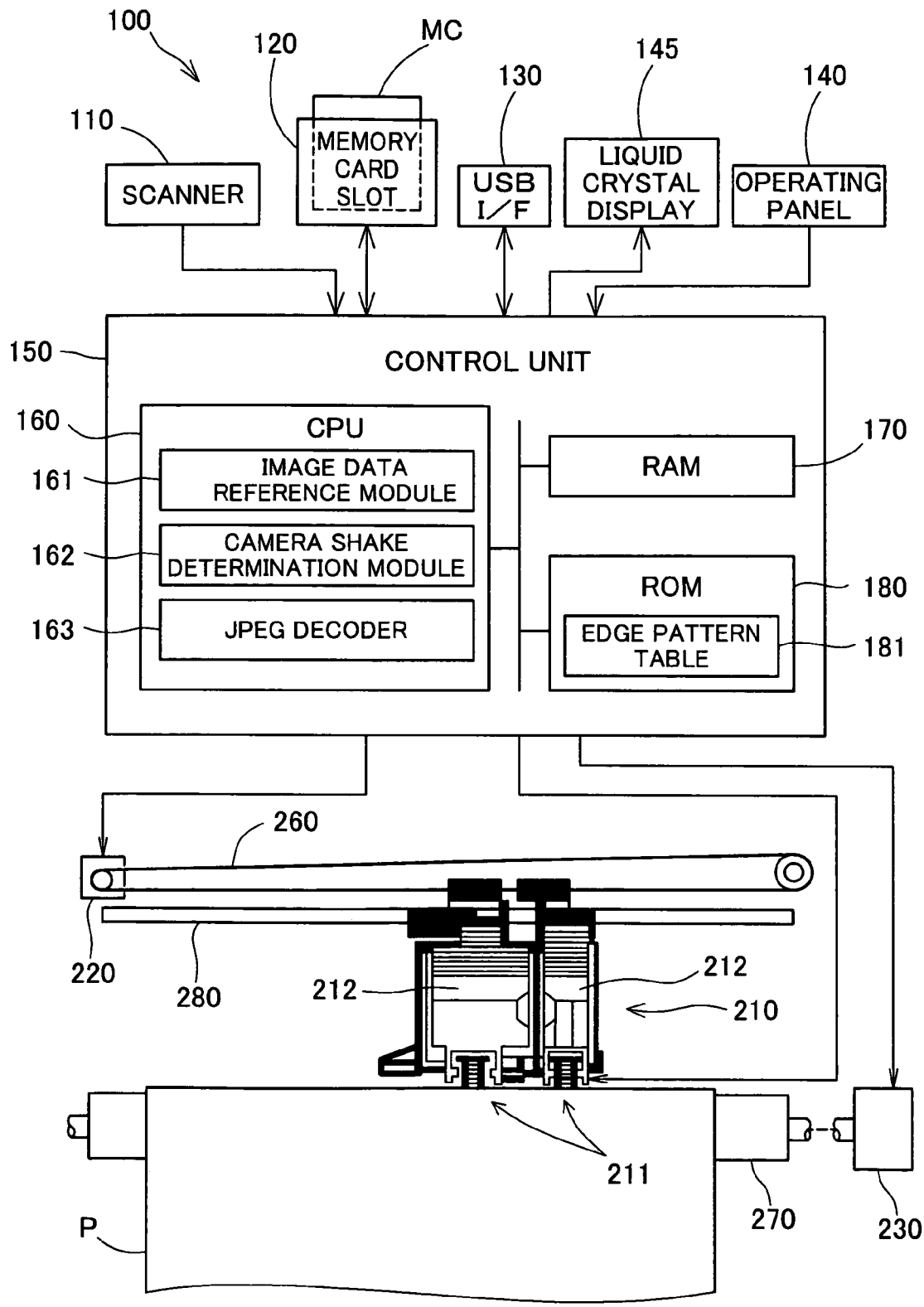
FIG. 2 shows an internal structure of printer.

FIG. 2 illustrates the internal structure of the printer 100. As illustrated, As a mechanism for printing on the printing paper, the printer 100 is equipped with a carriage 210 on which ink cartridges 212 are mounted, a carriage motor 220 for driving the carriage 210 in the main scanning direction, a paper feed motor 230 for feeding the printing paper P in the sub-scanning direction.

The carriage 210 is equipped with a total of 6 ink heads 211 corresponding to the inks representing the colors of cyan, magenta, yellow, black, light cyan, and light magenta. The ink cartridges 212 housing these inks are mounted on the carriage 210. The ink supplied from the ink cartridges 212 to the ink heads 211 are ejected onto the printing paper P when piezo elements (not shown) are actuated.

The carriage 210 is movably supported by a sliding shaft 280 located parallel to the axial direction of the platen 270. The carriage motor 220 rotates a drive belt 260 according to commands from a control unit 150, so that the carriage 210 travels reciprocally parallel to the axial direction of the platen 270, that is, in the main scanning direction. The paper feed motor 230 rotates the platen 270 to feed-printing paper P perpendicular to the axial direction of the platen 270. That is, the paper feed motor 230 can relatively move the carriage 210 in the sub-scanning direction.

The printer 100 is equipped with the control unit 150 to control the operation of the above ink heads 211, carriage motor 220, and paper feed motor 230. Connected to the control unit 150 are the scanner 110, the memory card slot 120, the USB interface 130, the operating panel 140, and the liquid crystal display 145 which are illustrated in FIG. 1.

The control unit 150 comprises a CPU 160, RAM 170, and ROM 180. Stored in the ROM 180 are a control program for controlling the operation of the printer 100 and an edge pattern table 181 used in the camera shake determination process described below. The CPU 160 runs the control program stored in the ROM 180 by loading it to the RAM 170 to execute the illustrated functional modules (161 to 163).

The control unit 150 is equipped with an image data reference module 161, camera shake determination module 162, and JPEG decoder 163 as the functional modules run by the CPU 160. The operations of these functional modules are briefly described below (see the contents of the various processed described below for more detailed operations).

The image data reference module 161 is a module by which the JPEG format image data ("JPEG data" below) recorded on the memory card MC or digital camera is referenced through the memory card slot 120 or USB interface 130. Images are recorded in 8 pixel×8 pixel block units in JPEG data. The image data in these blocks is compressed in the following order: 1) conversion of pixel values from RGB color space to YCbCr color space; 2) discrete cosine transform (DCT) from the spatial domain to the frequency domain; 3) quantization in which data volume is reduced; and 4) Huffman coding, which is a form of entropy encoding.

Figure 3:
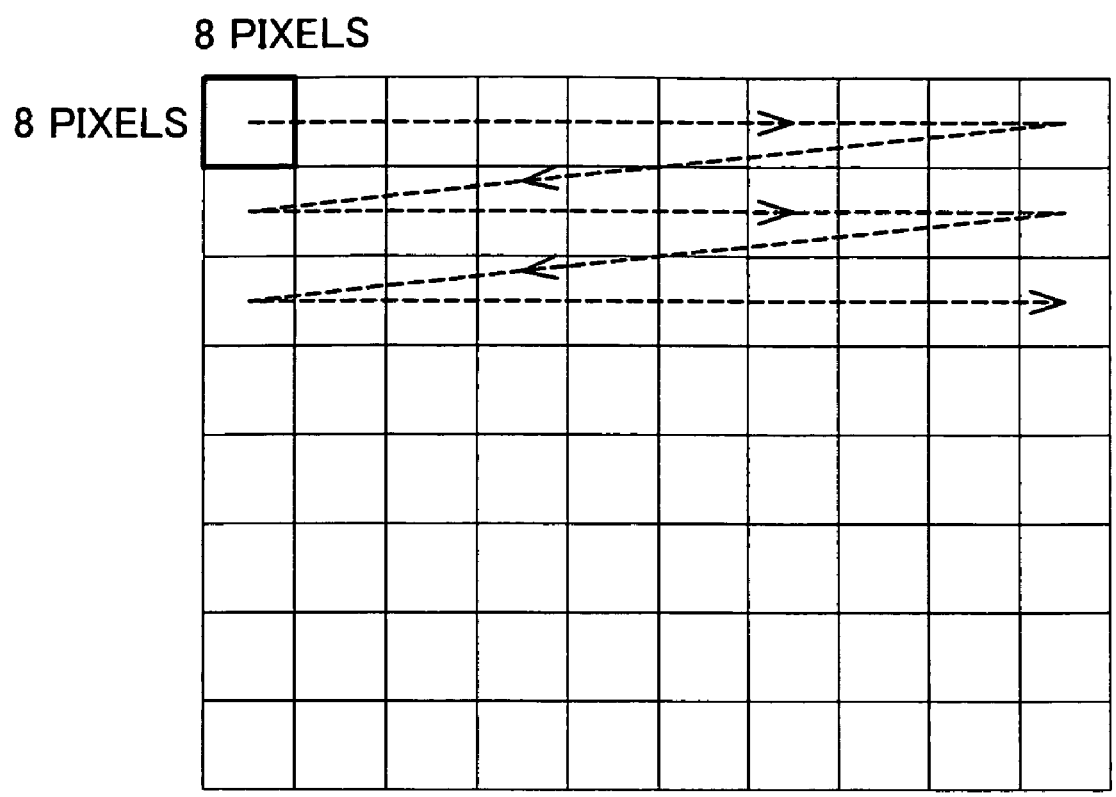
FIG. 3 shows an illustration of data recorded per block in JPEG data.

FIG. 3 illustrates data recorded per block in JPEG data. As illustrated, 8 pixel×8 pixel blocks are recorded row by row in the JPEG data. Although the data in each block may also be recorded in other sequences in JPEG data, in this embodiment, the blocks are recorded in the sequence given in FIG. 3.

The JPEG decoder 163 (see FIG. 2) is a functional module by which the JPEG data referenced by the image data reference module 161 is decoded into data in bit map format.

Figure 4:
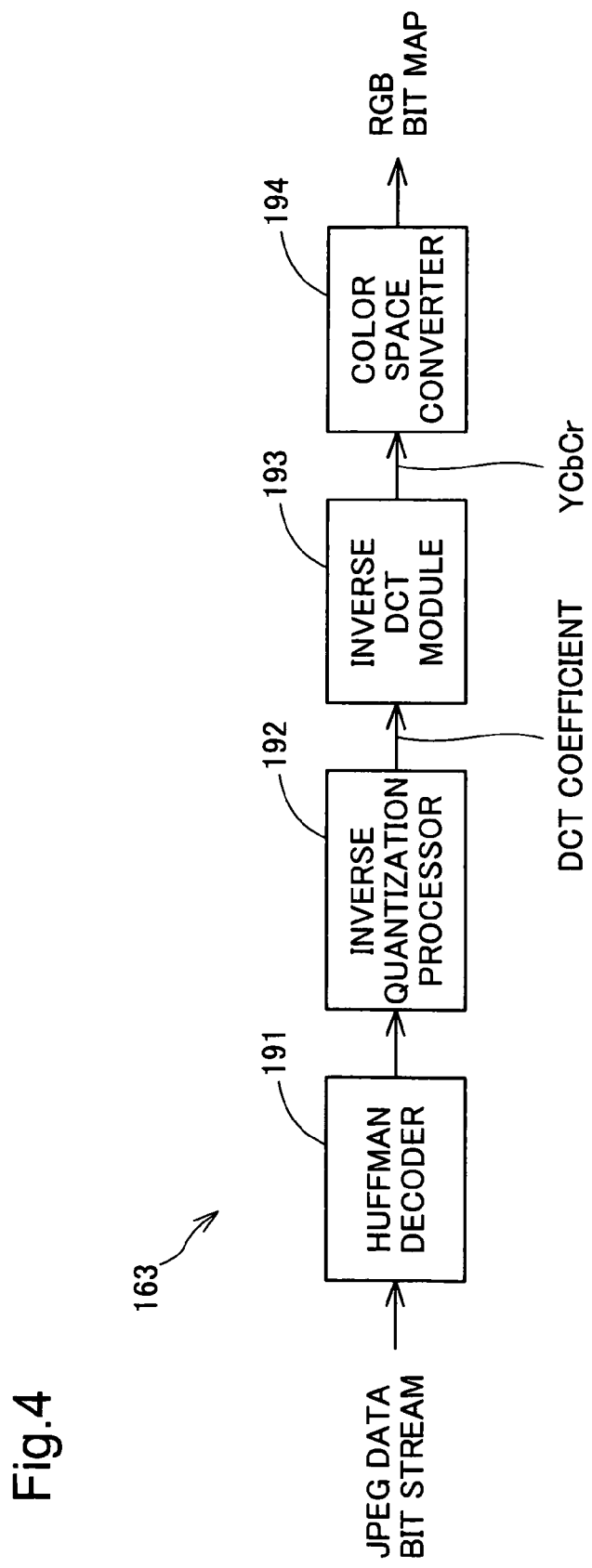
FIG. 4 shows a detailed illustration of structure of JPEG decoder.

FIG. 4 is a detailed illustration of the structure of the JPEG decoder 163. As illustrated, the JPEG decoder 163 comprises a Huffman decoder 191, inverse quantization processor 192, inverse DCT module 193, and color space converter 194.

The Huffman decoder 191 has the function of decoding the JPEG data bit stream which has undergone lossless compression by means of Huffman coding.

The inverse quantization processor 192 is a functional module that uses a certain quantization table for inverse quantization of the data decoded by the Huffman decoder 191 to determine the 8×8 DCT coefficient per block.

The inverse DCT module 193 is a functional module for the inverse DCT of the DCT coefficients determined by the inverse quantization processor 192 to determine image data in the YCbCr format.

The color space converter 194 is a functional module by which the data in YCbCr format obtained by the inverse DCT module 193 is converted to bit map data in the RGB format.

Here, the description returns to FIG. 2. The camera shake determination module 162 is a functional module wherein the Huffman decoder 191 and inverse quantization processor 192 with which the JPEG decoder 163 is equipped are used for the Huffman decoding and inverse quantization of the JPEG data to determine blurring based on the DCT coefficients that are thus obtained. The camera shake determination module 162 of the embodiment corresponds to the "camera shake determination module", "blur level determination module" and "ellipticity determination module" of the invention.

FIG. 5 illustrates a series of DCT coefficients that are obtained by the inverse quantization processor 192. As illustrated, from the blocks, a total of 64 DCT coefficients are obtained, from F00 to F77, at the stage where the inverse quantization has taken place. The coefficient F00 that is in the left uppermost position is referred to as the DC component, and the other coefficients are referred to as AC components. The closer the coefficients are to the right and bottom, the higher the frequency.

The camera shake determination module 162 has the function of determining camera shake by extracting coefficients F01, F02, F03, F04, F05, F06, and F07 that are AC components only in the horizontal direction (first direction) described as "horizontal coefficient group" in the figure or coefficients F10, F20, F30, F40, F50, F60, and F70 that are AC components only in the vertical direction (second direction) described as "vertical coefficient group." Details on the camera shake determination process using these coefficient groups are given below.

B. Printing Process

Figure 6:
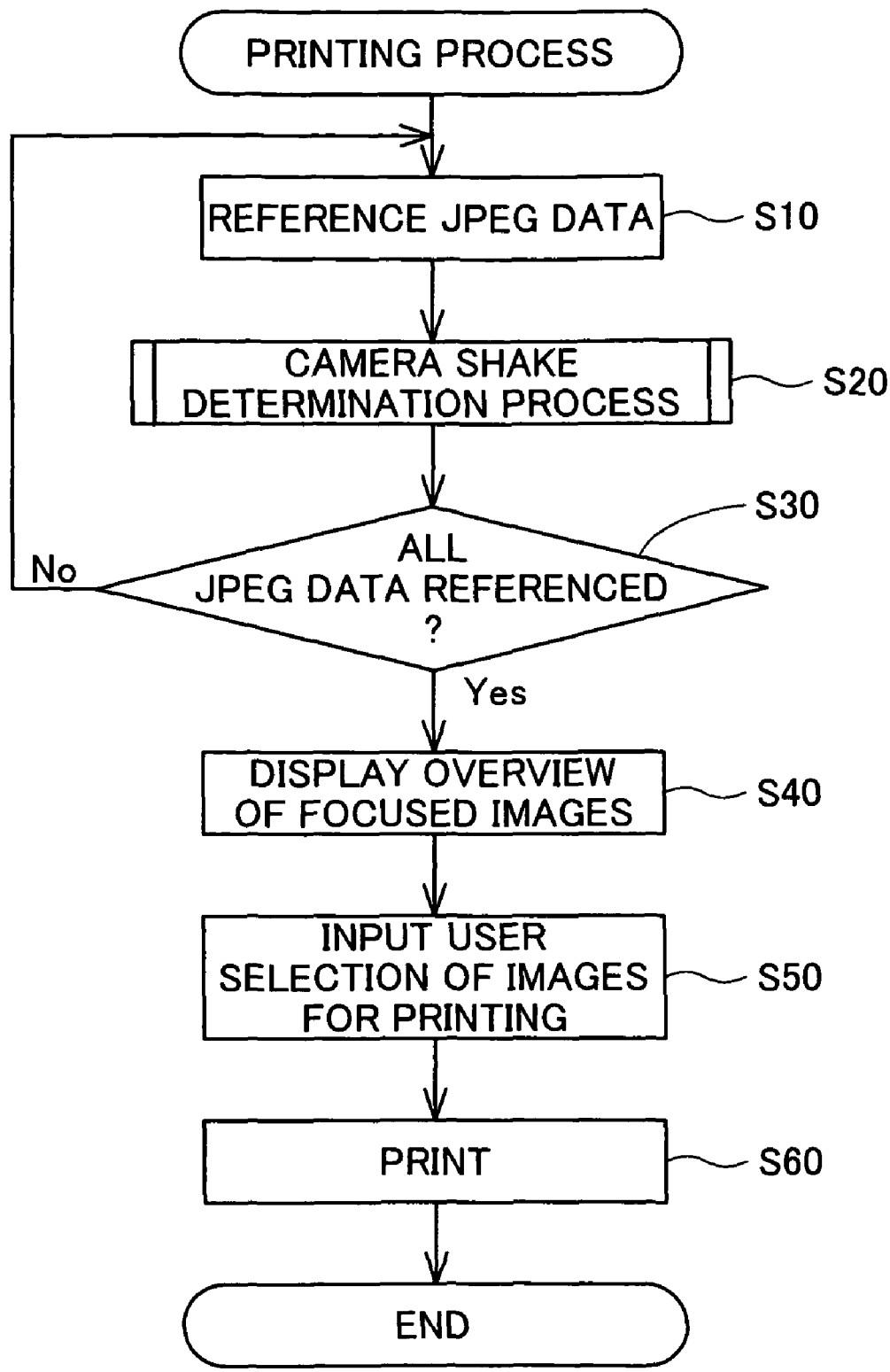
FIG. 6 is a flow chart of printing process.

FIG. 6 is a flow chart of the printing process carried out by the CPU 160 of the printer 100. The printing process is carried out to print image data recorded on the memory card MC.

When the printing process is started in response to certain operations by a user manipulating the operating panel 140, first the CPU 160 references a JPEG data set recorded on a memory card MC by means of the image data reference module 161 (Step S10). Here, the JPEG data on a memory card was referenced, but the JPEG data on a computer or digital camera connected by the USB interface 130 can also be referenced.

When JPEG data is referenced, the CPU 160 uses the camera shake determination component 162 to carry out the camera shake determination process on the referenced JPEG data (Step S20). Details on the camera shake determination process are given below.

When the camera shake determination process for one set of JPEG data is finished, the CPU 160 determines whether all the JPEG data on the memory card MC has been referenced (Step S30). When it is determined by this process that not all of the JPEG data has been referenced (Step S30: No), the process returns to Step S10, and the next JPEG data set is referenced to carry out the camera shake determination process on that JPEG data.

When it is determined in Step S30 that all of the JPEG data has been referenced (Step S30: Yes), an overview of the JPEG data determined to be focused images by the camera shake determination process in Step S20 is displayed by the CPU 160 on the liquid crystal display 145 (Step S40).

When the overview of the focused images is displayed on the liquid crystal display 145, the CPU 160 receives the user's selection of the images for printing via the operating panel 140 (Step S50). The selected image data format is converted with the use of the JPEG decoder 163 from JPEG format to bit map format, and is furthermore converted to data to control the amount of ink injection, and the ink heads 211, paper feed motor 230, and carriage motor 220 are controlled for printing (Step S60).

In the printing process noted above, all the JPEG data on the memory card MC was referenced, but when a plurality of folders have been created on a memory card, it is also possible to reference just the JPEG data included in folders indicated by the user. It is also possible to reference only JPEG data taken in a certain year or month or on a certain day.

C. Camera Shake Determination Process

Figure 7:
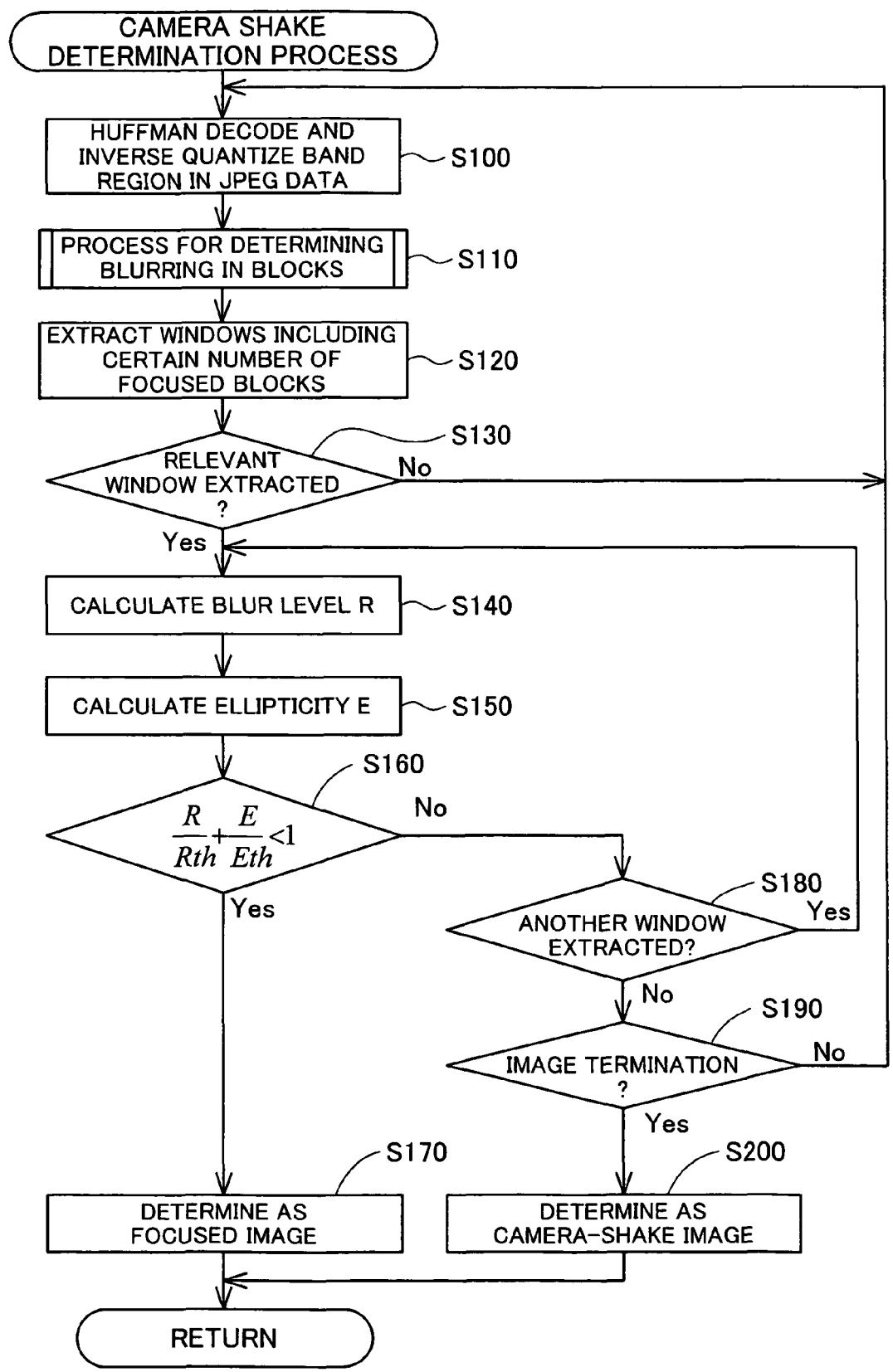
FIG. 7 is a flow chart of camera shake determination process.

FIG. 7 is a flow chart of the camera shake determination process run in Step S20 of the printing process illustrated in FIG. 6. This camera shake determination process is carried out to determine whether the currently referenced JPEG data is a focused image or a camera shake image.

When the camera shake determination process is carried out, the CPU 160 first reads block data per certain band region from among the currently referenced JPEG data, and the data undergoes Huffman decoding and inverse quantization using the JPEG decoder 163 to obtain DCT coefficients (Step S100). The DCT coefficients that are obtained are temporarily stored in RAM 170.

Figure 8:
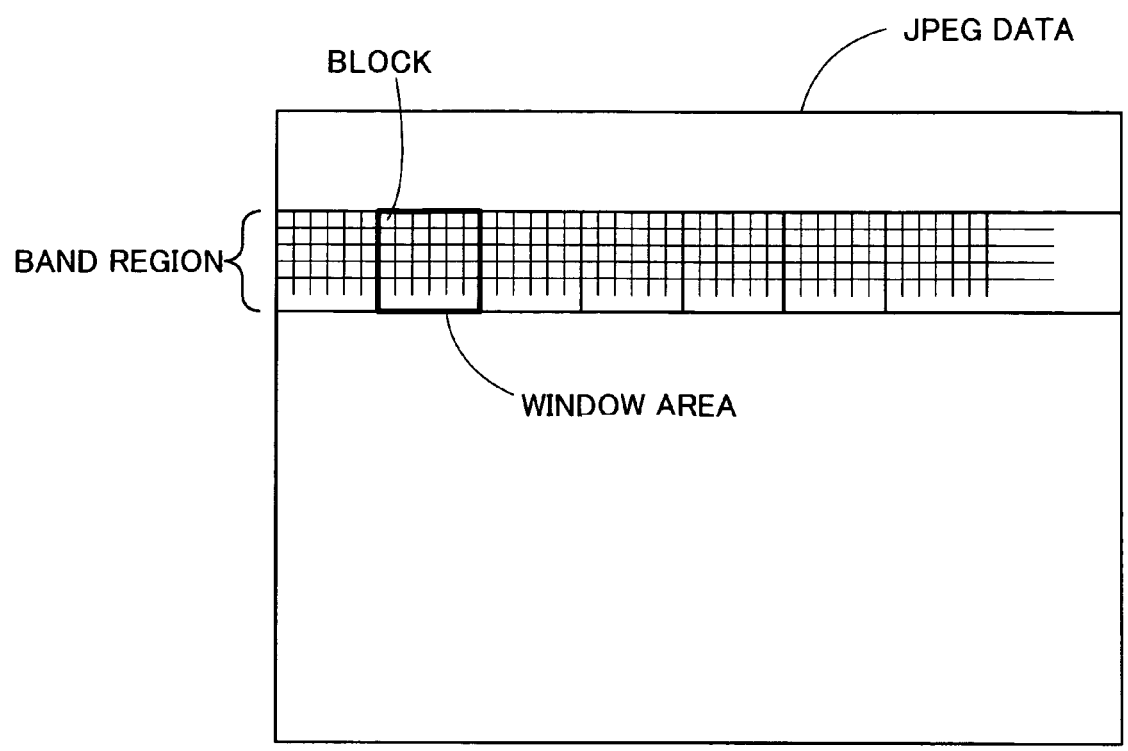
FIG. 8 shows an outline of band region.

FIG. 8 outlines the "band region" noted above. As illustrated, in this embodiment, "band region" refers to a band-shaped region in which the number of blocks in the horizontal direction is the same as the number of blocks of JPET data in the horizontal direction, and there is a number of blocks in the vertical direction (such as 30 blocks). In the above Step S100, DCT coefficients are obtained by the Huffman decoding and inverse quantization of the block data in the band region as the data is read from the JPEG data. the storage volume of the RAM 170 can be reduced by reading data from the JPEG data per band-shaped region, not the entire image.

Returning to FIG. 7, when the DCT coefficients in the band region are stored in the RAM 170 in Step S100 above, the CPU 160 then runs a process for determining blurring in blocks based on the DCT coefficients stored in RAM 170 (Step S110).

Figure 9:
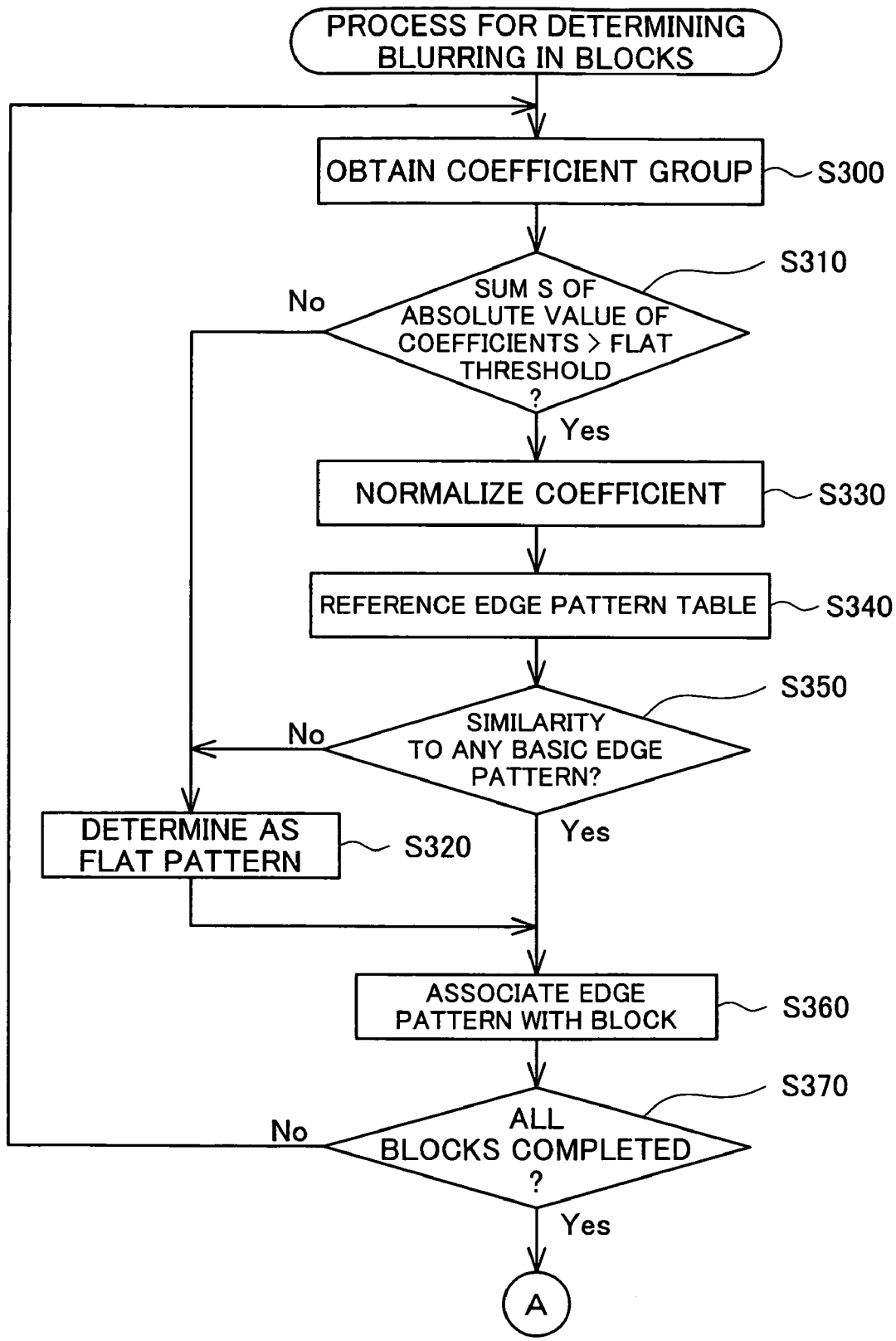
FIG. 9 is a flow chart of process for determining blurring in blocks.
Figure 10:
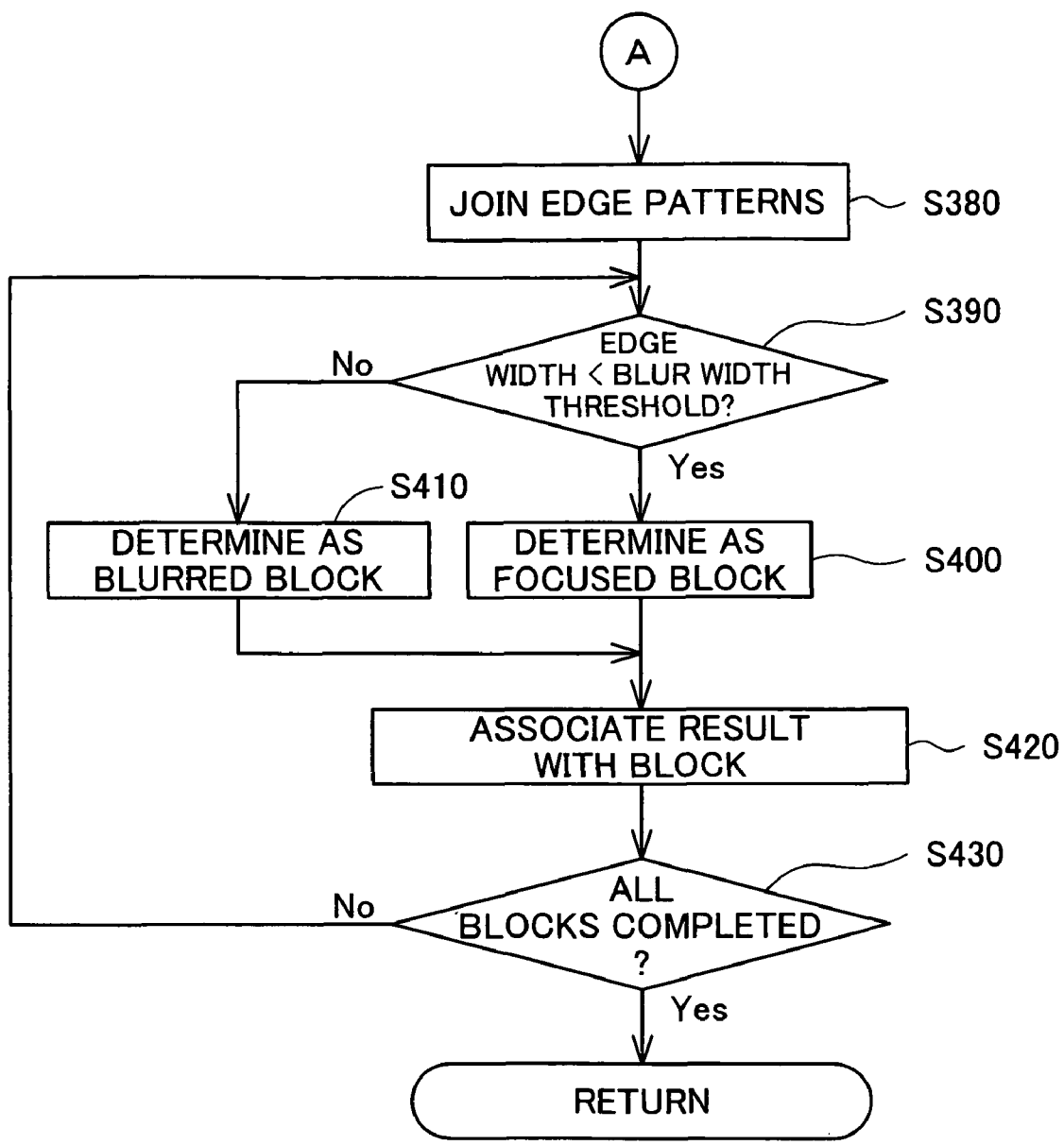
FIG. 10 is a flow chart of process for determining blurring in blocks.

FIGS. 9 and 10 are flow charts of the process for determining blurring in blocks. This is a process in which the horizontal coefficient group and vertical coefficient group in FIG. 5 are used to determine whether all the blocks in the band region stored in RAM 170 are "focused blocks" or "blurred blocks." Unless otherwise noted, the process for determining blurring in blocks will be described below for cases in which blurring in the horizontal direction is analyzed, since the process is the same for blocks in both the horizontal and vertical directions.

When the process is carried out, the CPU 160 first obtains a horizontal coefficient group F0$i$ ($i$=1 to 7) which is an AC component in the horizontal direction illustrated in FIG. 5 from among the 8×8 DCT coefficients constituting the blocks (vertical coefficient group Fj0 ($j$=1 to 7) in the case of the vertical direction) (Step S300).

When a coefficient group is obtained, the CPU 160 determines the sum S of the absolute values of each coefficient that has been obtained based on the following Equation (1), and determines whether the value is over a certain flat threshold (Step S310).

$$S=\Sigma |F0i| \ (i=1 \text{ to } 7) \quad (1)$$

In Step S310 above, when the sum S is determined to be at or below the certain flat threshold (Step S310: No), the change in luminance represented by the coefficient of the block subject to analysis is regarded as being flat, and the block subject to analysis is determined to be a "flat pattern" (Step S320).

Meanwhile, when the sum S is determined to be over the certain flatness threshold in Step S310 (Step S310: Yes), it can be determined that there has been some change in luminance in the block subject to analysis. The CPU 160 then first normalizes the obtained coefficients by the following Equation (2) to permit easier comparison with the basic edge patterns described below (Step S330). The coefficient values Fr01 through Fr07 normalized by means of the normalization process are values obtained by dividing the coefficient values F01 through F07 by the sum S of the absolute values of the coefficient group.

$$Fr0i=F0i/S \ (i=1 \text{ to } 7) \quad (2)$$

The CPU 160 then references the edge pattern table 181 stored in ROM 180 (Step S340) to determine whether the gradient pattern represented by the normalized coefficient values Fr01 through Fr07 resemble any of the basic edge patterns (Step S350).

FIG. 11 illustrates an example of the edge pattern table 181. In the edge pattern table 181, 16 basic edge patterns (3rd column in figure) are aligned with the corresponding pattern numbers "A1" through "A16" (1st column in figure). The horizontal axis of the basic edge patterns represents the location of the coefficients in the block (F01 through F07 or F10 through F70), and the vertical axis represents the normalized coefficient values Fr. In other words, the basic edge pattern is composed in terms of data consisting of seven coefficient values.

Each basic edge pattern is produced based on the luminance pattern shown in the 2nd column of FIG. 11. That is, the basic edge patterns in the 3rd column of FIG. 11 are produced by doing DCT and normalizing the luminance patterns shown in the 2nd column of the figure. The luminance patterns in the figure are not actually recorded in the edge pattern table 181 but are shown here to facilitate an understanding of the process. The luminance patterns represent typical patterns of changes in luminance in a block pre-arranged into 16 types. In this embodiment, the basic edge patterns are divided into 16 types in this manner, but they may also be divided into more or fewer types.

Also aligned with the basic edge patterns in the edge pattern table 181 are the three parameters of left edge width LW, middle edge width MW, and right edge width RW. The left edge width LW represents the width of the flat portion on the left side of the luminance pattern, and the right edge width RW represents the width of the flat portion on the right side of the luminance pattern. The middle edge width MW represents the width of the gradient flanked by the left edge width LW and right edge width RW.

Although not shown in the figure, in addition to the basic edge patterns from "A1" to "A16" in the edge pattern table 181, edge patterns that are mirror images of the basic edge patterns are defined as pattern numbers B1 through B16, and vertically inverted edge patterns are defined as pattern numbers C1 through C16. Vertically inverted mirror images of the basic patterns "A1" through "A16" are defined as pattern numbers D1 through D16. That is, 64 basic edge patterns in all are defined in the edge pattern table 181.

Returning to the flow chart in FIG. 9, in Step S350 in FIG. 9, the absolute value of the difference between the coefficient values Fr01 through Fr07 normalized in Step S330 and the coefficient values Fb01 through Fb07 constituting the basic edge pattern are calculated according to Formula (3) below, and the basic edge pattern with the lowest total SD is selected from among those in the edge pattern table 181. If the total SD of the selected basic edge pattern is lower than a certain threshold, it is determined that a basic edge pattern of similar shape has been retrieved (Step S350: Yes). On the other hand, if the SD obtained by the above calculations is greater than the certain threshold, it is determined that a similar basic edge pattern has not been retrieved (Step S350: No), and the block subject to analysis is determined to be a "flat pattern" (Step S320).

$$SD=\Sigma |Fr0i-Fb0i| \ (i=1 \text{ to } 7) \quad (3)$$

If the similar basic edge pattern that has been retrieved in Step S350 above is determined to be a flat pattern in Step S320, the CPU 160 associates the basic edge pattern with the block (Step S360). When it is determined that edge patterns have not been associated with all of the blocks in the band region (Step S370), the process returns to Step S300 to associate an edge pattern with the next block.

When it is determined in the above Step S370 that edge patterns have been associated with all blocks (Step S370: Yes), the CPU 160 runs a process for joining the horizontal and vertical edge patterns for the blocks in the band region (Step S380 in FIG. 10).

Figure 12:
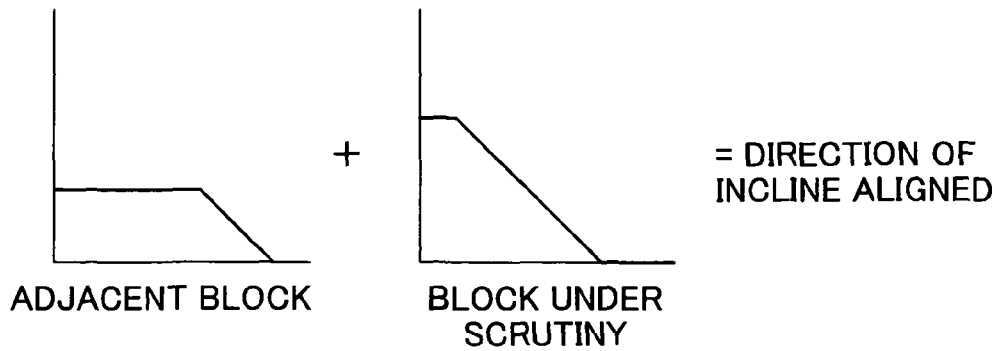
FIG. 12 shows an outline of process for joining edge patterns.
Figure 13:
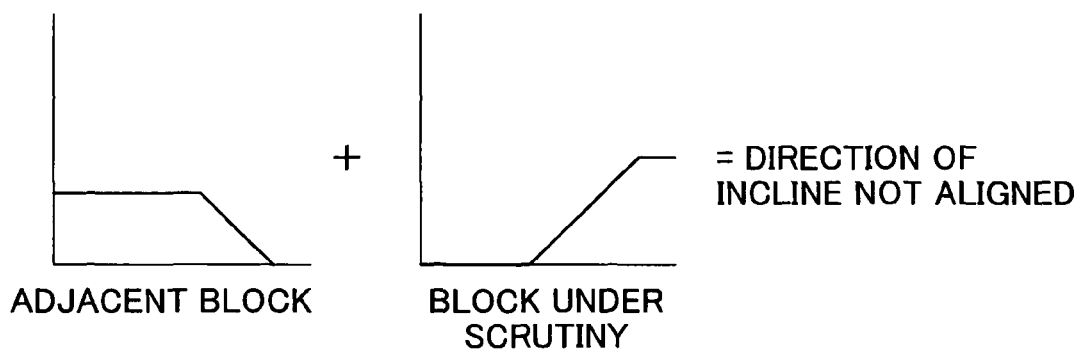
FIG. 13 shows an outline of process for joining edge patterns.
Figure 14:
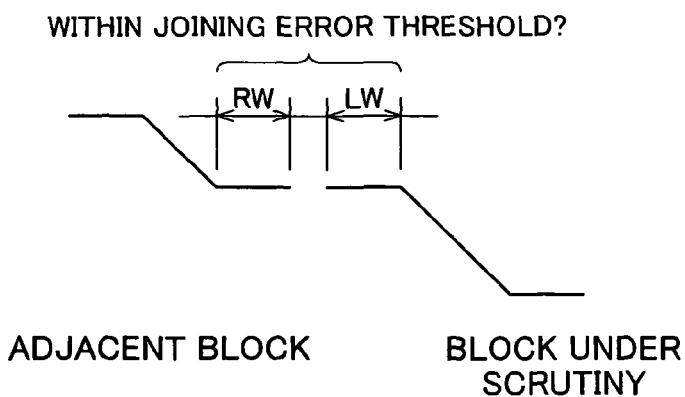
FIG. 14 shows an outline of process for joining edge patterns.

FIGS. 12 through 14 outline the process for joining the edge patterns. As shown in FIG. 12, for example, if the direction of the incline of the edge patterns in adjacent blocks is aligned, those edge patterns are considered to form the same blurred portion in the image. The CPU 160 thus determines whether the added values of the left edge width LW of the block under scrutiny and the right edge width RW of the adjacent block are within a certain joined error threshold, as shown in FIG. 14. If the values are within the joined error threshold, the edge patterns in these blocks can be concluded to form the same blurred portion. In such cases, the middle edge width ME of the two blocks are added to the right edge width RW and left edge width LW to calculate an edge pattern straddling the blocks. The edge width total is associated with the blocks currently subject to analysis, and the association of the edge width of other blocks in the blur is "unknown." Joining adjacent edge patterns in this manner will allow the width of the blur to be accurately determined even when the blurred portion in an image is greater than the size of 1 block. Meanwhile, when the direction of the incline of the edge pattern in the adjacent block is not aligned, as shown in FIG. 13, the edges are not joined, and the association of the edge width in the two blocks is "unknown."

Returning to FIG. 10, when edge patterns have been associated with all the blocks in the band region, the CPU 160 determines whether the edge width associated with each block is under a certain blur width threshold (such as 12 pixels) (Step S390). If the result is that the edge width is less than the blur width threshold, the block is determined to be a "focused block" (Step S400). If, on the other hand, the edge width is at or over the blur width threshold or the edge width is "unknown," the block is determined to be a "blurred block" (Step S410).

When each of the blocks has thus been determined to be a "focused block" or "blurred block," the CPU 160 associates the results with each block (Step S420). When it is determined that not all of the blocks have been finished (Step S430), the process returns to Step S390 to determine whether the remaining blocks are focused. If, on the other hand, it is determined that all the blocks are finished, the CPU 160 finishes the process for determining blurring in blocks, and the process returns to the camera shake determination process in FIG. 7.

Returning to FIG. 7, when it is determined by the above process for determining blurring in blocks (Step S110) whether each block in the band region is a "blurred block" or a "focused block," the CPU 160 then divides the band region into a plurality of regions in the horizontal direction (these regions are referred to below as "window areas") as illustrated in FIG. 8. The CPU 160 tallies the number of focused blocks in the window areas, and extracts the window areas with a total at or over a certain number (Step S120). The size of the window areas, on L-ban size printing paper (8.9 cm×12.7 cm), for example, can be a size of 1 cm×1 cm, which will allow focusing to be determined for practical purposes (a size of about 30×30 blocks, assuming an image of 6,000,000 pixels is printed on L-ban size printing paper).

When the window areas are extracted in Step S120 above (Step S130: Yes), the window areas can be assumed to be focused areas because of the abundance of focused blocks that are included. However, even though an abundance of focused blocks are included, because the blocks can still be affected by camera shake, the CPU 160 uses the parameters "blur level R" and "ellipticity E" described below to determine whether or not there is any camera shake in the window areas.

Figure 15:
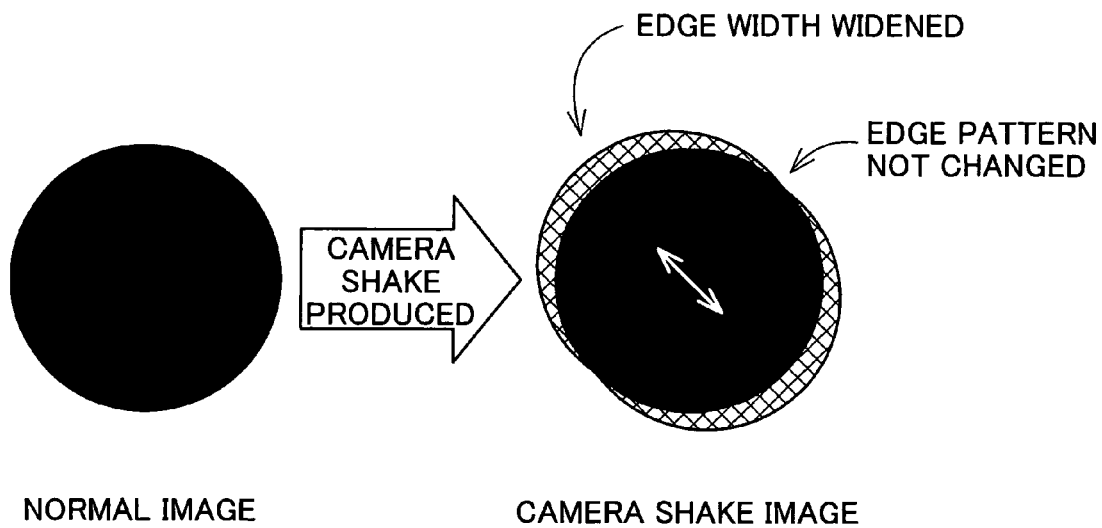
FIG. 15 shows an outline of concept of blur level R.

FIG. 15 outlines the concept of blur level R. The left figure illustrates a normal image with no camera shake, and the right figure illustrates an example of an image with oblique camera shake. When an image is affected, as illustrated, the edge width widens in the direction of the shake (cross-hatched areas in figure). Thus, when camera shake occurs, there is a greater proportion of the number of blocks including blurred edges relative to the total number of blocks including edges. This proportion is referred to as "blur level R" in this embodiment.

The blur level R can be determined by calculating the proportion of blocks determined to be "blurred blocks" in the above Step S420 out of the blocks determined to have some change in luminance in the above Step S310. Because the blocks determined to have some change in luminance in Step S310 are the total number of focused blocks and blurred blocks, the blur level R of the current window areas can be determined by the following Equation (4), where "FB" is the number of focused blocks in the window areas and "BB" is the number of blurred blocks.

$$R = BB/(FB+BB) \quad (4)$$

Figure 16:
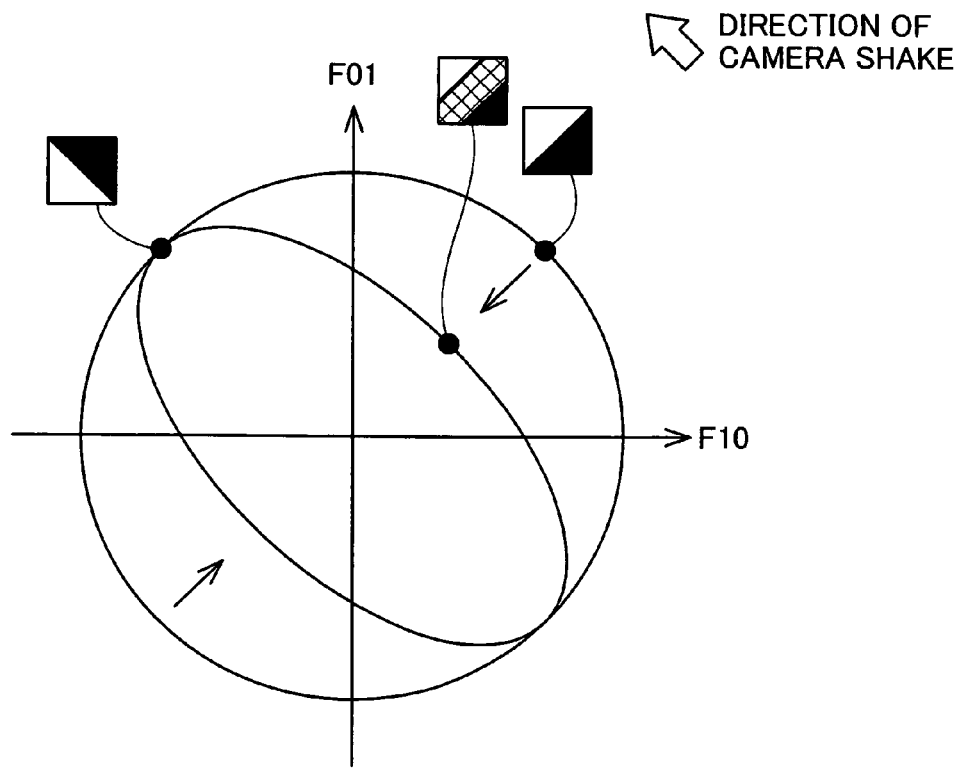
FIG. 16 shows an outline of concept of ellipticity E.

The ellipticity E is discussed below. FIG. 16 outlines the concept of ellipticity E. As illustrated in FIG. 15, the edge width widens in the direction of camera shake in camera shake images, but as a result, the frequency of the edge portion in the frequency domain naturally becomes lower. The value of the coefficient F01 or F10 in FIG. 5 thus becomes lower. In FIG. 16, the camera shake-induced changes in the distribution of coordinates (F10, F01) on the two-dimensional plane of the coordinate system where the vertical coordinate axis represents the coefficient value F01 and the horizontal coordinate axis represents the coefficient value F10.

As illustrated, when the coefficient values F01 and F10 of the blocks included in a normal image with no camera shake, for example, are present without any elliptical bias, there is no change in the coefficient values because there is no change in the edge width for edges along the direction of camera shake in camera shake images such as is shown in the right side of FIG. 15. However, because of the expansion of the width of edges perpendicular to the direction of camera shake, the coefficient values decrease, and the coordinates (F10, F01) shift in the direction of the point of origin. Thus, in images with camera shake, the coefficients are biased elliptically as illustrated according to the direction of camera shake. The ellipticity of this ellipse can thus be determined to determine whether the extent to which the image is affected by camera shake.

FIG. 17(A) and FIG. 17(B) illustrate specific examples camera shake-induced change in coefficients. FIG. 17(A) shows a normal image with no camera shake (image of globe) and the distribution of DCT coefficients for the image, and FIG. 17(B) shows an image with camera shake and the distribution of DCT coefficients for the image. As illustrated, when camera shake occurs in an image, the distribution of DCT coefficients changes from a round to an elliptical distribution.

The ellipticity E can be calculated by the following Equation (5), where "xi" is the coefficient F01 in each block present in the window area, "yi" is the coefficient F10 (i=1, 2, . . . , N) (N is the total number of blocks in the window area), and "X", "Y," and "Z" mean the following. According to Equation (5), the greater the effect of the camera shake on the image, the closer the ellipticity E will be to "1," based on an elliptical distribution of DCT coefficients.

$$X = \sum_{i=1}^{N} x_i^2 \quad (5)$$

$$Y = \sum_{i=1}^{N} y_i^2$$

$$Z = \sum_{i=1}^{N} x_i y_i$$

$$E = 1 - \frac{(X+Y) - \sqrt{(X-Y)^2 + Z^2}}{(X+Y) + \sqrt{(X-Y)^2 + Z^2}}$$

Returning to FIG. 7, when the CPU 160 calculates the blur level R and ellipticity E described above (Steps S140 and S150), it is determined whether the relationship between the blur level R and ellipticity E meets the following conditional equation (6) (Step S160). Rth in the following equation can be, for example, 0.6 to 1.0, and Eth can be 0.8 to 1.0.

$$\frac{R}{Rth} + \frac{E}{Eth} < 1 \qquad (6)$$

Figure 18:
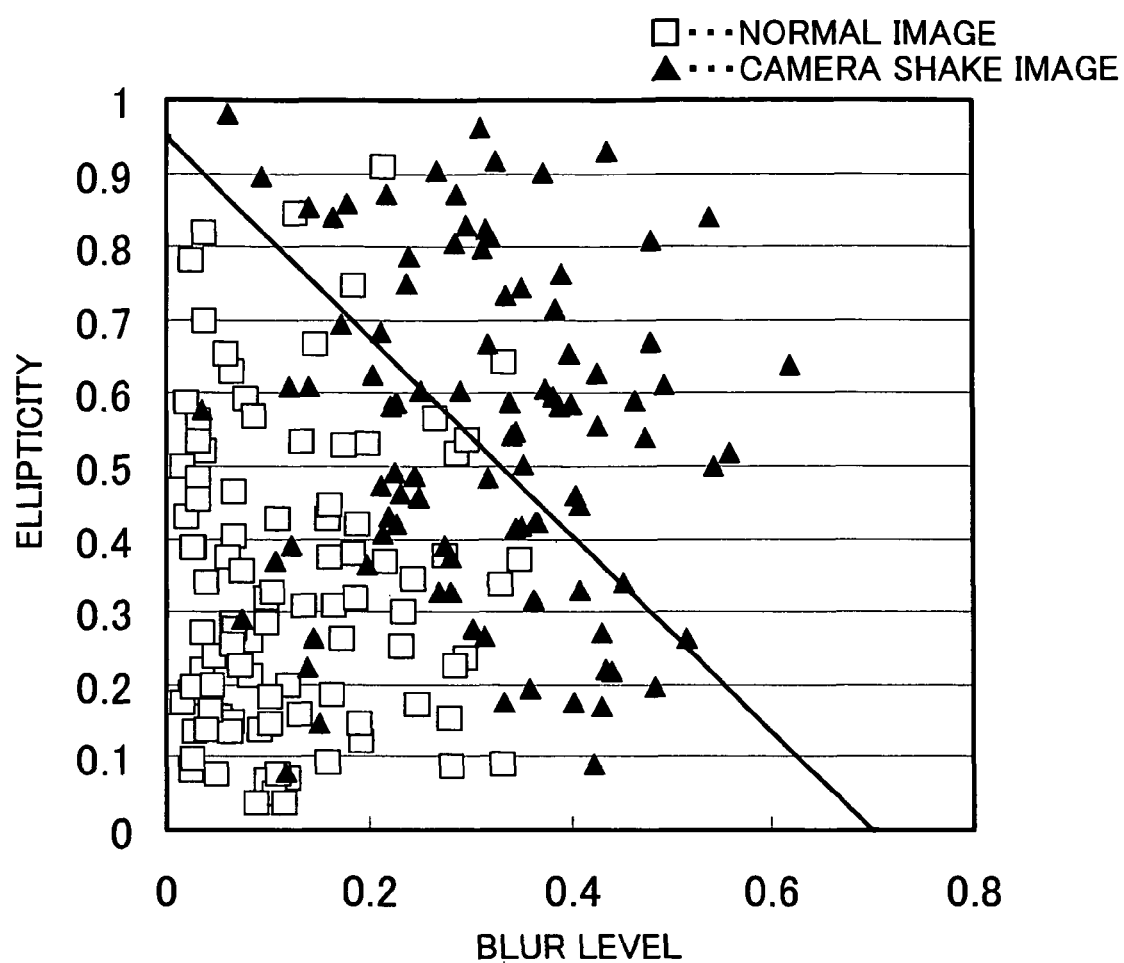
FIG. 18 shows an illustration of significance of Equation (6)

FIG. 18 illustrates the significance of Equation (6) above. In FIG. 18, the blur level R and ellipticity E were calculated for 96 normal images visually distinguished as normal and 96 images visually distinguished with camera shake, and the coordinates of the resulting values were plotted on a two-dimensional plane where the horizontal axis represented the blur level R and the vertical axis represented the ellipticity E. As illustrated, the results were plotted farther away from the point of origin (0, 0) in the images with camera shake and were plotted nearer to the point of origin in the normal images.

The line drawn in the figure to differentiate the camera shake images and the focused images in the interests of eliminating obvious camera shake images represents the relationship in Equation (6) above. That is, when Equation (6) is met, the images are located in the area on the bottom left of the line in the figure (near the point of origin), and the current window area in this case can thus be determined to be focused. On the other hand, when Equation (6) is not met, the images are located in the area on the upper right of the line in the figure, and the CPU 160 can thus determine that camera shake has occurred in the current window area in this case.

In Step S160, when the relationship between the blur level R and ellipticity E is determined to meet the relationship of Equation (6) (Step S160: Yes), the current window area can be determined to be focused as described above. In that case, the CPU 160 determines that the entire image is focused (Step S170), and the camera shake determination process is finished. That is because the image can be determined to be normal if a location is in focus in the image. The processing time needed to determine camera shake can thus be shortened by concluding the camera shake determination process at the point in time when it is determined that any window area in the image is focused.

By contrast, when the relationship between the blur level R and ellipticity E is determined not to meet the relationship in Equation (6) (Step S160: No), the current window area can be determined to not be focused, as noted above. The CPU 160 then determines whether another window area has been extracted in Step S120 (Step S180). When, as a result, another window area has been extracted for the current band region (Step S180: Yes), the process of the above steps S140 to S160 is repeated for the window area to determine whether it is focused. The blur level R and ellipticity E may be separately determined for each window area at this time, but the blur level R and ellipticity E may also be determined using the blocks of all window areas thus far extracted. This will permit more accurate determination of camera shake because of the greater number of samples of blocks needed for the calculations.

In the above Step S180, when it is determined that no other window area has been extracted for the current band region (Step S180: No), the CPU 160 determines whether the current band region is the termination of the image (Step S190). If the current band region is thus the termination of the image, it will turn out that the window area is not focused anywhere, the image is therefore determined to be a camera shake image (Step S200), and the camera shake determination process is completed. By contrast, if the current band area is not the termination of the image, the process returns to Step S100, and the above process is repeated for the next band region.

When the above camera shake determination process is complete, the CPU 160 returns the process to the printing process shown in FIG. 6. When the camera shake determination process described above is carried out on all the JPEG data recorded on a memory card, images with camera shake can be eliminated, allowing only focused JPEG data to be presented to the user.

D. Effects

According to the printer 100 in the embodiment described above, the storage volume in RAM 170 can be reduced because the JPEG data recorded on a memory card MC or the like can be divided into band regions and stored in RAM 170.

In the present embodiment, only window areas including an abundance of focused blocks are subject to detailed determination of blurring. This can thus alleviate the processing burden imposed on the CPU 160.

In the present embodiment, blurring can be rapidly determined because the entire image is determined to be focused when a window area is focused in any location.

In the present embodiment, camera shake is determined based entirely on DCT coefficients, without converting the JPEG data to bit map format. The processing load imposed on the CPU 160 can therefore be alleviated, and camera shake can be determined more rapidly.

In present embodiment, the concepts of blur level R and ellipticity E were introduced, and these parameters were used to determine whether camera shake had occurred in ages based on Equation (6), thus allowing camera shake to be determined more objectively and with greater accuracy.

2. 2nd Embodiment

Figure 19:
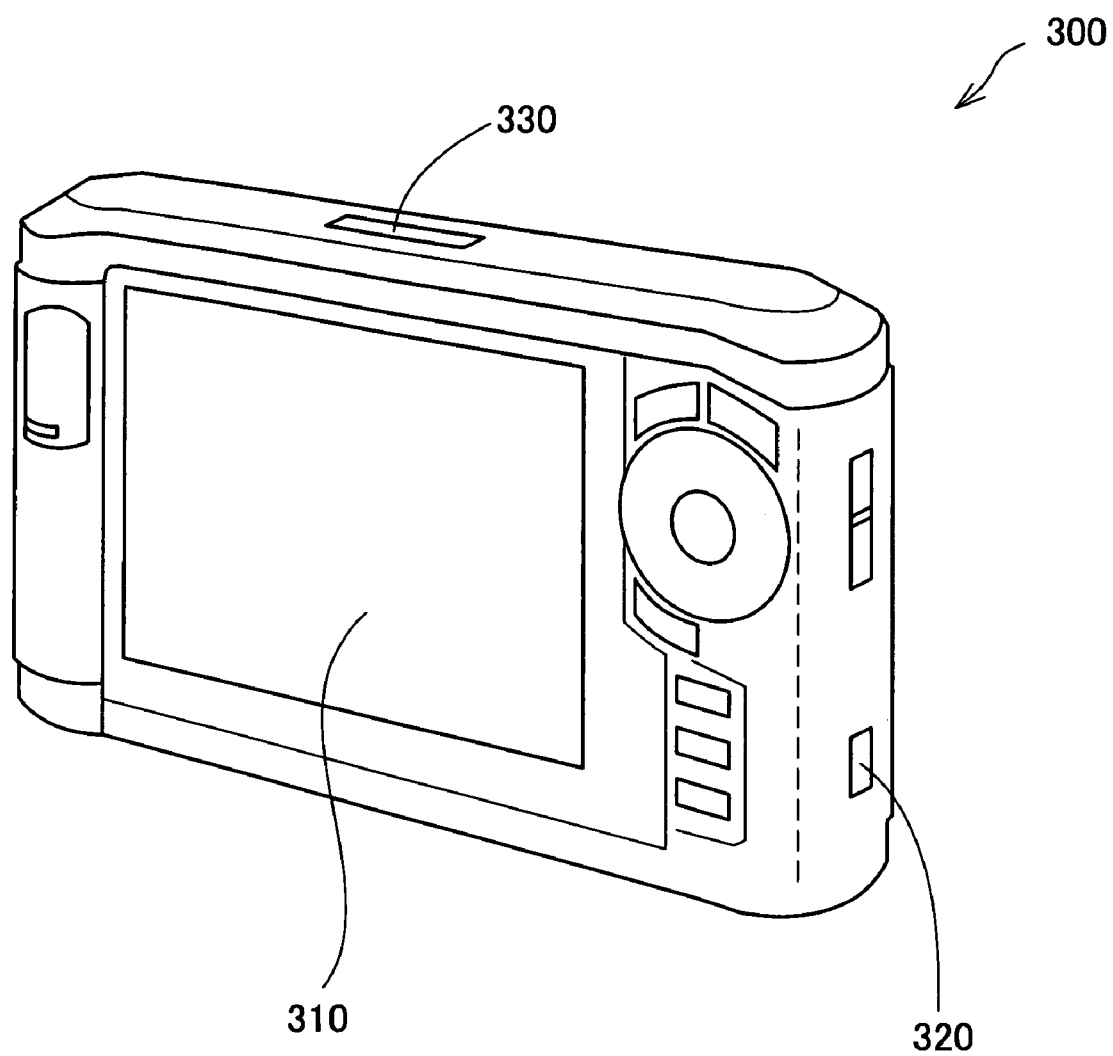
FIG. 19 shows an appearance of photo viewer in second embodiment.

FIG. 19 illustrates the appearance of a photo viewer as a second embodiment of the invention. The photo viewer 300 of the present embodiment is equipped with a monitor 310, USB interface 320, and memory card slot 330. The interior is equipped with a CPU, RAM, and ROM, as well as a hard disk drive or flash memory storage device.

The photo viewer 300 has the function of allowing the image data recorded in a storage device to be displayed on the monitor 310. Images from a digital camera or personal computer are transferred via the USB interface 320 to the internal storage device. The photo viewer 300 reads images from memory cards that are inserted into the memory card slot 330 and transfers the images to the storage device. A printer can be connected to the USB interface 320. The photo viewer 300 controls the printer using an internally installed printer driver so as to print the image data stored in the storage device.

The CPU in the photo viewer 300 runs a control program stored in ROM by loading it in RAM so as to carry out the image transfer function or image display function described above. The CPU also runs the control program to carry out the same processes as the various processes described in the first embodiment (printing process and camera shake determination process). The photo viewer 300 can thus automatically extract focused images from out of the image data stored in the storage device and display the images on the monitor 310. The photo viewer 300 can also control the printer connected to the USB interface 320 to print the focused images that have been extracted.

3. 3rd Embodiment

Figure 20:
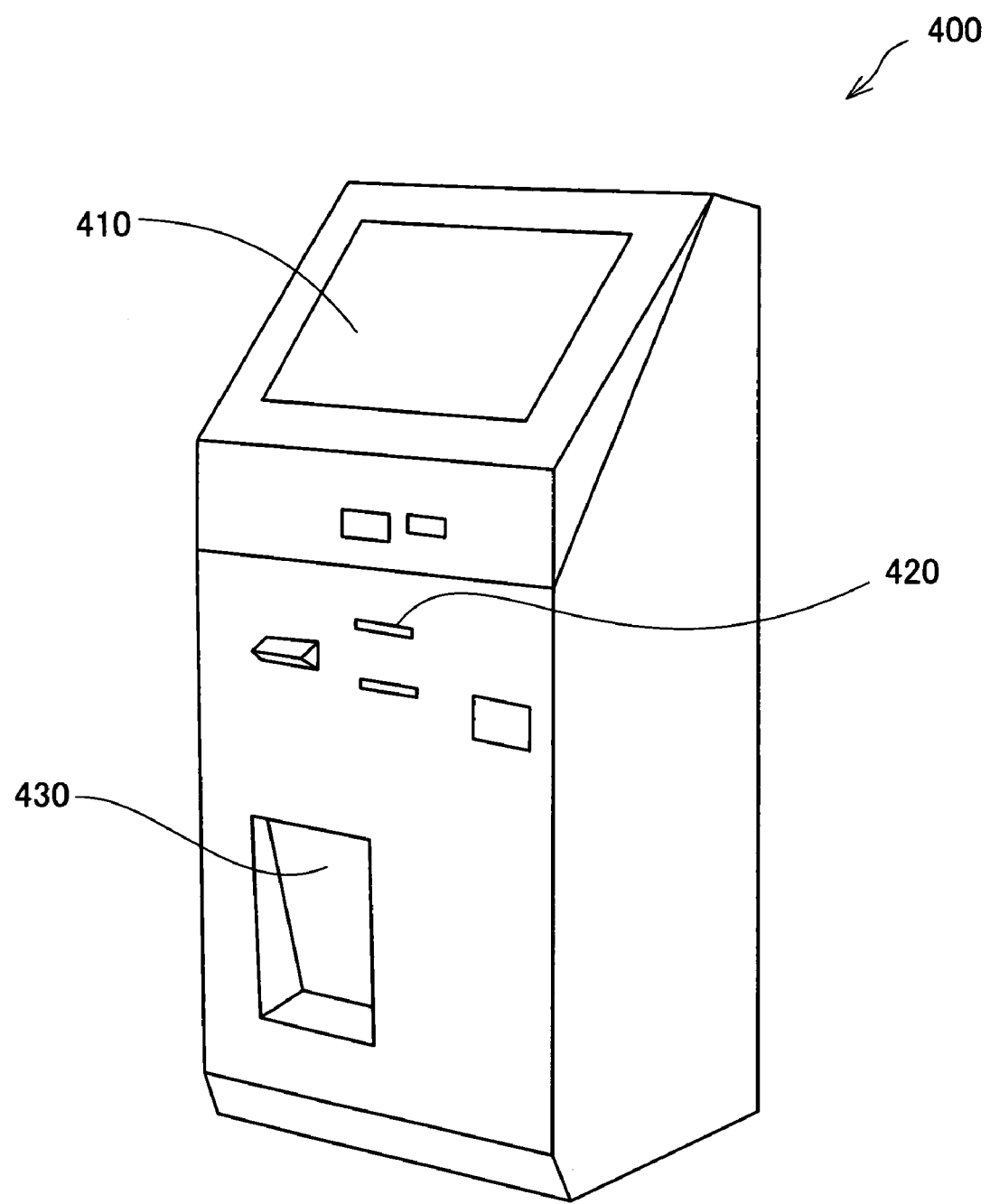
FIG. 20 shows an appearance of kiosk terminal in third embodiment.

FIG. 20 illustrates the appearance of a kiosk terminal as a third embodiment of the invention. The kiosk terminal 400 is a device located on streets or in various shops, and is equipped with a ticket-issuing function, ATM function, or various guided service functions.

The kiosk terminal 400 in this embodiment is equipped with a monitor 410, memory card reader 420, and printer 430. It is also internally equipped with a CPU, RAM, and ROM. The CPU executes a control program stored in ROM by loading the program in RAM, so as to carry out the above ticket-issuing function, ATM function, or various guided service functions. The CPU also runs the control program to carry out the same processes as the various processes described in the first embodiment (printing process and camera shake determination process). The kiosk terminal 400 can thus read image data from memory cards inserted into the memory card reader 420 and automatically select focused images to display them on the monitor 410. The focused images that have thus been extracted can also be printed by the kiosk terminal 400 using the printer 430.

In this embodiment, the kiosk terminal 400 was equipped with a printer 430, but a structure without the printer 430 can also be devised. In that case, the kiosk terminal 400 ca print to a remote printer connected through certain communications lines such as a network or the Internet.

4. Modifications

Various embodiments of the invention have been described above, but it need hardly be pointed out that the invention is not limited to those embodiments and can assume a variety of structures within the spirit and scope of the invention.

For example, the camera shake can be determined by a computer in structures wherein the various processes noted above are carried out by a computer.

When the various processes described above are implemented by a digital camera, the camera used to take photographs can determine whether or not there is any camera shake. In this case, the digital camera can record the results of the camera shake determination in the EXIF data of the JPEG data. Such JPEG data can be used to allow printers or computers to select printing images or implement the various imaging processes according to the camera shake data recorded in the EXIF data. As described in the above embodiment, the incline of the ellipse illustrated in FIG. 16 varies according to the direction of camera shake. The direction of camera shake may thus be determined according to the incline, and the results of the determination may be recorded in the EXIF data. Printers and computers to which the image data has been read, for example, can thus carry out the image processing for eliminating blurring according to the direction of camera shake.

In the above examples, the camera shake was determined sequentially starting from the window areas located in the upper part of the image, but camera shake can also be determined moving sequentially starting from the window areas in the bottom part of the image. Camera shake may also be determined by sequentially moving spirally out from the center of the image. This will allow camera shake to be more efficiently determined, as the primary subjects are often photographed in the bottom or middle of images.

When the blur width is determined per block in the process for determining blurring in blocks described above, weighted coefficients may be calculated according to the location of the block. For example, higher weighting of blocks near the middle of the image can allow blurring to be more strictly determined near the middle of images.

In the process for determining camera shake above, the presence or absence of camera shake was determined based on the above Equation (6). However, in addition to this, the range of blur level and ellipticity determined for blurring can be pre-stored in a table, for example, to allow the presence or absence of camera shake to be determined based on the table. Using the table in this manner will allow the camera shake to be determined more stringently because more complex conditions can be defined.

If even one window area was determined as not being blurred was detected in the process for determining camera shake above, the image was determined to be a focused image. By contrast, a determination that the image is focused may be reached if a plurality (such as about 2 to 6) window areas are detected, for example. A determination that the image is focused may also be reached if window areas in predetermined locations (such as the middle of the image) are not blurred.

In the above embodiments, image data in the JPEG format was used as an example of image data in which were recorded two or more coefficients obtained when pixel values that are values in the spatial domain of pixels forming the image are converted to the frequency domain. However, the present invention can be applied to image data of other formats represented by coefficients in addition to image data in JPEG format. For example, DCT can be done in 4×4 pixel block units with the image format referred to as "HD Photo."An edge pattern table can thus be prepared in advance according to the block size to allow blurring to be determined in the same manner as the examples above. FIG. 21 illustrates an example of an edge pattern table for a block size of 4×4. In the case of a block size of 4×4, the 16 types of basic edge patterns in FIG. 11 can be used replaced by the 4 types of basic edge patterns, as shown in FIG. 21.

The coefficients recorded in the image data are not limited to coefficients obtained as a result of the DCT. For example, coefficients obtained by the DWT (discrete wavelet transform) or the Fourier transform may also be recorded in image data. Blurring can be determined in the same manner as in the above embodiments by producing an edge pattern table in advance based on coefficients obtained as a result of these transforms.

5. Other Aspects

In the device of the above aspect of the invention, the ellipticity determination module may determine the extent to which the distribution of the coordinates is elliptically biased as the ellipticity.

The Applicant discovered that the distribution of coordinates composed of the first and second coefficients was generally round in images with no camera shake and that the distribution of coordinates was generally biased elliptically in the direction of camera shake in images with camera shake. It is therefore possible to readily determine whether camera shake has occurred in images by determining the extent of the elliptical bias in the distribution of coordinates as the ellipticity.

In the device of the above aspect, the camera shake determination module may make a determination based on whether or not the coordinates composed of the blur level and ellipticity are within a certain domain when the blur level and ellipticity are represented on two-dimensional plane based on vertical and horizontal axes.

In this aspect, the presence or absence of camera shake can be determined by a simple procedure in which coordinates on a two-dimensional plane composed of the blur level and ellipticity either are or are not within a certain domain.

In the device of the above aspect, as the blur level becomes higher, the greater the extent of blurring, and as the ellipticity becomes higher, the greater the extent of bias, and the camera shake determination module may determine that the blurring in the image has not been produced by camera shake when the coordinates composed of the blur level and ellipticity are located on the point of origin side of a line connecting a certain coordinate on the vertical axis and a certain coordinate on the horizontal axis.

This aspect allows it to be readily determined whether or not there is any camera shake according to whether coordinates composed of the blur level and ellipticity are inside (on the point of origin side) or outside a line connecting certain coordinates on the vertical axis and certain coordinates on the horizontal axis.

In the device of the above aspect, the blur level determination module may determine whether or not there are any edges by comparing a series of a plurality of coefficients in the blocks with various types of basic edge patterns whereby typical gradient patterns of the changes in pixel values are represented by values corresponding to coefficients.

This aspect allows it to be readily determined whether or not there are any edges in blocks simply by comparing a series of a plurality of coefficients in blocks with pre-determined basic edge patterns.

In the device of the above aspect, the image data reference module may divide the image data into window areas that are aggregates of a plurality of the blocks, and may reference the image data by window area, the blur level determination module may calculate the blur level by window area, the ellipticity determination module may calculate the ellipticity by window area, and the camera shake determination module may determine whether or not blurring has been produced by camera shake by window area.

This aspect allows it to be efficiently determined whether or not there is camera shake by dividing the image data into window areas.

In the device of the above aspect, the camera shake determination module may determine that the image is a normal image when there are at least a certain number of window areas in which it has been determined that no blurring was produced.

This aspect allows an entire image to be determined as the correct image when a certain number of window areas with no blurring have been detected. Blurring can thus be rapidly detected. In terms of the order of window areas for detecting blurring, blurring may be detected, for example, starting from the window area located at the top of the image or starting from the window area located at the bottom of the image. Blurring may also be detected by moving spirally away from the center of the image. The "certain number" may be, for example, one or about 2 to 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for determining whether or not blurring in images has been produced by camera shake, the device comprising:
    an image data reference module configured to reference image data in which has been recorded, per block unit, coefficients that are obtained when pixel values forming an image in a spatial domain are converted to a frequency domain per block unit composed of a plurality of pixels;
    a blur level determination module configured to detect whether edges are included per block unit using the coefficients, and determine as a blur level the proportion of edges, among the detected edges, in which the edge width is over a certain threshold;
    an ellipticity determination module configured to determine coordinates composed of first coefficient values and second coefficient values per block in a coordinate system in which the coordinate axes are first coefficient values representing frequency components in a first direction in the blocks and second coefficient values representing frequency components in a second direction perpendicular to the first direction in the blocks, and calculate an extent of bias in the distribution of the coordinates as the ellipticity; and
    a camera shake determination module configured to determine whether blurring in the image has been produced by camera shake based on the relationship between the blur level and the ellipticity.

2. A device according to claim 1, wherein the ellipticity determination module determines the extent to which the distribution of coordinates is elliptically biased as the ellipticity.

3. A device according to claim 1, wherein the camera shake determination module makes determinations based on whether or not the coordinates composed of the blur level and the ellipticity are within a certain range when the blur level and the ellipticity are represented on a two-dimensional plane based on vertical and horizontal axes.

4. A device according to claim 3, wherein
    as the blur level becomes higher, the greater the extent of blurring, and as the ellipticity becomes higher, the greater the extent of bias, and
    the camera shake determination module determines that the blurring in the image has not been produced by camera shake when the coordinates composed of the blur level and the ellipticity are located on the point of origin side of a line connecting a certain coordinate on the vertical axis and a certain coordinate on the horizontal axis.

5. A device according to claim 1, wherein the blur level determination module determines whether or not there are any edges by comparing a series of coefficients in the block with various types of basic edge patterns whereby typical gradient patterns of the changes in pixel values are represented by values corresponding to the coefficients.

6. A device according to claim 1, wherein
    the image data reference module divides the image data into window areas that are aggregates of a plurality of the blocks and references the image data by window area,
    the blur level determination module calculates the blur level by window area,
    the ellipticity determination module calculates the ellipticity by window area, and
    the camera shake determination module determines whether or not blurring has been produced by camera shake by window area.

7. A device according to claim 6, wherein the camera shake determination module determines that the image is a normal image when there are at least a certain number of window areas in which it has been determined that no blurring was produced.

8. A device according to claim 1, wherein the image data is produced based on the JPEG standard, and the coefficients are obtained by discrete cosine conversion of the pixel values by block.

9. A device according to claim 8, wherein the camera shake determination module records the result of the determination in the header of the image data.

10. A method for determining whether or not blurring in an image has been produced by camera shake, the method comprising:
- referencing image data in which has been recorded, per block unit, coefficients that are obtained when pixel values forming an image in a spatial domain are converted to a frequency domain per block unit composed of a plurality of pixels;
- detecting whether edges are included per block unit using the coefficients, and determining as a blur level the proportion of edges, among the detected edges, in which the edge width is over a certain threshold;
- determining coordinates composed of first coefficient values and second coefficient values per block in a coordinate system in which the coordinate axes are first coefficient values representing frequency components in a first direction in the blocks and second coefficient values representing frequency components in a second direction perpendicular to the first direction in the blocks, and calculating an extent of bias in the distribution of the coordinates as the ellipticity; and
- determining whether blurring in the image has been produced by camera shake based on the relationship between the blur level and the ellipticity.

11. A computer program product for determining whether or not blurring in an image has been produced by camera shake, the computer program product comprising:
- a non-transitory computer readable medium; and
- a computer program stored on the non-transitory computer readable medium, the computer program causing a computer to implement the functions of:
- referencing image data in which has been recorded, per block unit, coefficients that are obtained when pixel values forming an image in a spatial domain are converted to a frequency domain per block unit composed of a plurality of pixels;
- detecting whether edges are included per block unit using the coefficients, and determining as a blur level the proportion of edges, among the detected edges, in which the edge width is over a certain threshold;
- determining coordinates composed of first coefficient values and second coefficient values per block in a coordinate system in which the coordinate axes are first coefficient values representing frequency components in a first direction in the blocks and second coefficient values representing frequency components in a second direction perpendicular to the first direction in the blocks, and calculating an extent of bias in the distribution of the coordinates as the ellipticity; and
- determining whether blurring in the image has been produced by camera shake based on the relationship between the blur level and the ellipticity.

* * * * *